(12) United States Patent
Benz et al.

(10) Patent No.: US 6,451,947 B1
(45) Date of Patent: Sep. 17, 2002

(54) HIGH ENERGY DENSITY CAPACITORS AND COMPOUNDS FOR USE IN THEIR PREPARATION

(75) Inventors: Michael E. Benz, Ramsey; Edward DiDomenico, Anoka; Randall V. Sparer, Andover, all of MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 09/620,278

(22) Filed: Jul. 18, 2000

Related U.S. Application Data

(62) Division of application No. 09/893,727, filed on Dec. 18, 1997, now Pat. No. 6,184,324.
(60) Provisional application No. 60/033,114, filed on Dec. 18, 1996.

(51) Int. Cl.$^7$ .............................................. C08F 222/40
(52) U.S. Cl. ..................... 526/310; 526/307; 526/311; 526/241; 428/461; 361/311
(58) Field of Search ................................. 526/307, 310, 526/311, 241; 428/461; 361/111

(56) References Cited

U.S. PATENT DOCUMENTS

| | | | |
|---|---|---|---|
| 2,017,537 A | 10/1935 | Hoffman et al. | |
| 2,368,521 A | 1/1945 | Clifford et al. | |
| 2,589,674 A | 3/1952 | Cook et al. | |
| 3,278,500 A | 10/1966 | Bailey, Jr. et al. | |
| 3,354,087 A | 11/1967 | Bailey, Jr. et al. | |
| 4,490,774 A | 12/1984 | Olson et al. | |
| 4,499,520 A | 2/1985 | Cichanowski | |
| 4,513,349 A | 4/1985 | Olson et al. | |
| 4,515,931 A | 5/1985 | Olson et al. | |
| 4,533,710 A | 8/1985 | Olson et al. | |
| 4,586,111 A | 4/1986 | Cichanowski | |
| 4,613,518 A | 9/1986 | Ham et al. | |
| 4,613,658 A | 9/1986 | Mathias et al. | |
| 4,793,949 A | 12/1988 | Mathias et al. | |
| 4,889,948 A | 12/1989 | Mathias et al. | |
| 4,906,767 A | 3/1990 | Mathias et al. | |
| 4,940,796 A | 7/1990 | Mathias et al. | |
| 4,954,371 A | 9/1990 | Yializis | |
| 4,985,522 A | 1/1991 | Mathias et al. | |
| 4,999,410 A | 3/1991 | Mathias et al. | |
| 5,026,802 A | 6/1991 | Mathias et al. | |
| 5,032,461 A | 7/1991 | Shaw et al. | |
| 5,094,759 A | 3/1992 | Mathias et al. | |
| 5,097,800 A | 3/1992 | Shaw et al. | |
| 5,134,175 A | 7/1992 | Lucey | |
| 5,137,936 A | 8/1992 | Akiguchi et al. | |
| 5,225,272 A | 7/1993 | Poole et al. | |
| 5,390,073 A | 2/1995 | McMillan | |
| 5,440,446 A | 8/1995 | Shaw et al. | |
| 5,519,087 A | 5/1996 | Tang | |
| 5,554,120 A | 9/1996 | Chen et al. | |
| 5,565,523 A | 10/1996 | Chen et al. | |
| 6,184,324 B1 * | 2/2001 | Benz et al. ................. | 361/311 |

FOREIGN PATENT DOCUMENTS

| | | |
|---|---|---|
| DE | 570677 | 2/1933 |
| EP | 146089 | 6/1985 |
| FR | 740410 | 1/1933 |
| JP | 5140234 | 6/1993 |

OTHER PUBLICATIONS

Kiyooka et al., "Reactivity of"–Metal (group 4) Esters. Lewis Acid Mediated Reactions of"–Tripenyltin Esters with Aldehydes and Acetals", *The Chemical Society of Japan,* 10, pp. 721–722 (1988).

Mathias et al., "Cyclopolymerization of the Ether of Methyl"–(Hydroxymethyl)acrylate, *Macromolecules,* 21, pp. 545–546 (1988).

Mathias et al., "New Difunctional Methacrylate Ethers and Acetals: Readily Available Derivatives of∀–Hydroxymethyl Acrylates", *Macromolecules,* 20, pp. 2039–2041, (1987).

Mathias et al., "Superfast Methacrylate Photomonomers: Ester Derivatives of Ethyl ∀–Hydroxymethacrylates", *Macromolecules,* 28, pp. 8872–8874 (1995).

"Organic Reactions: vol. V", John Wiley & Sons, Inc; New York, N.Y. (cover page and table of contents).

"Polymers of Biological and Biomedical Significance", ACS Symposium Series (Division of Polymer Chemistry, Inc. at the 204$^{th}$ National Meeting of the American Chemical Society); Washington, D.C. (1994).

Reed et al., "The Fundamentals of Aging in HV Polymer–film Capacitors", *IEEE Transactions on Dielectrics and Electrical Insulation,* pp. 904–922 (1994).

Semmelhack, *J. Am. Chem. Soc.,* 103,2427 (1981).

Shing et al., "Practical and Rapid Vicinal Hydroxylation of Alkenes by Catalytic Ruthenium Tetraoxide", *Angew. Chem.,* 33 , pp. 2312–2313 (1994).

Stansbury, "Observations Related to the Amine–Catalyzed Coupling Reaction of Aldehydes and Acrylates", *Macromolecules,* 26, pp. 2981–2982 (1993).

Stansbury, "Difunctional and Multifunctional Monomers Capable of Cyclopolymerization",*Macromolecules,* 24, pp. 2029–2035 (1991).

"The Chemistry of Acrylonitrile" American Cyanamid Company; Petrochemicals Department. New York, N.Y. (cover page and table of contents).

(List continued on next page.)

*Primary Examiner*—David W. Wu
*Assistant Examiner*—Tanya Zalukaeva
(74) *Attorney, Agent, or Firm*—Girma Wolde-Michael

(57) ABSTRACT

A high energy density capacitor comprising an organic polymeric dielectric material having a dielectric constant of at least about 7; wherein the organic polymeric dielectric material comprises polymerized alkyl (alpha-substituted) acrylate monomers having at least one dipole group; wherein when the monomers are polymerized, the dipole group is attached to the main polymeric chain through a heteroatom-containing linking group.

1 Claim, 5 Drawing Sheets

OTHER PUBLICATIONS

Thompson et al., "Facile Synthesis and Polymerization of Ether Substituted Methacrylates", *Polymer Journal*, 27, pp. 325–338 (1995).

Tsuda et al., "Cyclopolymerization of ether dimers of ∀-(hydroxymethyl)acrylic acid and its alkyl esters: substituent effect on cyclization efficiency and microstructures", *Polymer*, 35, pp. 3317–3328 (1994).

Tsuda et al., "New Dicyano–Containing Cyclopolymers Having High Stereoregularity Derived from Dimethacrylmalononitrile", *Macromolecules*, 26, pp. 6359–6363 (1993).

Tsuda et al., "Cyclopolymerization of Diallyl Malononitrile and the Thioether Dimer of Ethyl"–Chloromethylacrylate, *Pure Appl. Chem.*, A31, pp. 1867–1879 (1994).

Wells, "Group Electronegativities", *Prog. Phys. Org. Chem.*, 6, pp. 111–145 (1968).

Wideqvist, "New mononitriles of some dicarboxylic acids", *Arkiv f r Kemi*, 3, p. 59–67 (1951).

Antonucci et al., "Synthesis of Novel Hydrophilic and Hydrophobic Multifunctional Arcrylic Monomers", *Polymers of Biological and Biomedical Significance*, Chapter 16, pp. 191–201 (1994).

Avci et al., "Ester Derivatives of a–Hydroxymethylacrylates: Itaconate Isomers Giving High Molecular Weight Polymers", *Journal of Polymer Science,* 32, pp. 2937–2945 (1994).

"Barriers to Internal Rotation about Single Bonds", *Physical Organic Chemistry,* 6, pp. 1–81 (1968).

Byun et al., "Improved Synthesis of Ethyl"–(Bromomethyl) Acrylate and 2–Methylene–1,3–Propanediol Via Ethyl-"–(Hydroxymethyl) Acrylate", *Tetrahedron Letters,* 35, pp. 1371–1374 (1994).

"Dielectric Constant and Leakage Current of Spin Cast Samples", Phase Final Report II, Appendix A. Sigma Laboratories.

Hillmyer, "The Preparation of Functionalized Polymers by Ring–Opening Metathesis Polymerization", *UMI Dissertation Services*, A Bell & Howell Company (1997).

Inamoto et al., "Revised Method for Calculation of Group Electronegativities", *Chemistry Letters*, pp. 1003–1006 (1982).

Jariwala et al., "Syntheses, Polymerization, and Characterization of Novel Semifluorinated Methacrylates, Including Novel Liquid Crystalline Materials", *Macromolecules,* 26, pp. 5129–5136 (1993).

\* cited by examiner

HIGH ENERGY DENSITY CAPACITORS AND COMPOUNDS FOR USE IN THEIR PREPARATION

CROSS REFERENCE TO RELATED APPLICATIONS

This application is a division of application Ser. No. 09/893,727, filed Dec. 18, 1997, now U.S. Pat. No. 6,184,324.

This application claims priority from U.S. provisional application serial No. 60/033,114 entitled, "Synthesis of Acrylates Suitable for Production of Polymer", filed Dec. 18, 1996, which is incorporated herein by reference.

FIELD OF THE INVENTION

The present invention relates to high energy density capacitors and the dielectric materials used therein. It particularly relates to dielectric materials of polymerized (alpha-substituted)acrylate monomers or use in a thin film capacitor, such as a polymer multilayer capacitor.

BACKGROUND OF THE INVENTION

Capacitors, which basically include two electrodes separated by a dielectric material, are used in a wide variety of electrical applications to accumulate and store an electrical charge. The development of electronic devices and circuits of reduced size has led to a need for significantly smaller capacitors having increased capacity per unit volume and high temperature capabilities.

Thin polymer films offer significant potential to produce smaller capacitors with increased capacity per unit volume. Such capacitors could therefore reduce the size of implantable devices, such as defibrillators, which currently use relatively large aluminum electrolytic capacitors in which the dielectric is aluminum oxide. Such large capacitors have an energy density of about 2 Joules/centimeter$^3$ (J/cm$^3$), which leads to capacitors of about 15 cm$^3$. Smaller and lighter weight capacitors having higher energy densities (e.g., at (e.g., at least about3 J/cm$^3$) would provide significant advantage in decreasing the size of implantable devices.

One type of small, high energy density capacitor is referred to as a polymer multilayer (PML) capacitor. Examples of such capacitors are described, for example, in U.S. Pat. No. 4,499,520 (Cichanowski), U.S. Pat. No. 4,490,774 (Olson et al.), U.S. Pat. No. 4,954,371 (Yializis), 5,097,800 (Shaw et al.), and U.S. Pat. No. 5,032,461 (Shaw et al.). They are typically made by a vapor deposition process in which a polymerizable compound is vapor deposited onto a substrate and polymerized to form a polymer film. The polymerizable compounds are typically polymerized using electron beam or ultraviolet radiation. The polymer films are then typically metallized by either sputtering or vapor depositing a metal, such as aluminum. These processes (vapor coating, polymerizing, and metallizing) are repeated until the desired number of layers has been achieved.

Although there are a number of polymeric dielectric materials known for use in high energy density capacitors, such as PML capacitors, there is still a need for a wider variety of such materials that have the potential to produce smaller capacitors with increased. capacity per unit volume. There is a particular need to produce small high energy density capacitors for use in high voltage defibrillators.

A number of patents and other documents have been reviewed in which polymeric dielectric materials are disclosed. Also, a number of patents have been reviewed in which capacitors, particularly PML capacitors, are disclosed. Although not admitted as prior art, these documents are listed among others in Table 1 below.

TABLE 1

| LIST OF U.S. patents AND OTHER DOCUMENTS | | |
|---|---|---|
| U.S. Pat. No. | Inventor(s) | Issue Date |
| 2,017,537 | October 15, 1935 | Hoffman et al. |
| 2,368,521 | January 30, 1945 | Clifford et al. |
| 2,589,674 | March 18, 1952 | Cook et al. |
| 3,278,500 | October 11, 1966 | Bailey, Jr. et al. |
| 3,354,087 | November 21, 1967 | Bailey, Jr. et al. |
| 4,490,774 | December 25, 1984 | Olson et al. |
| 4,499,520 | February 12, 1985 | Cichanowski |
| 4,513,349 | April 23, 1985 | Olson et al. |
| 4,515,931 | May 7, 1985 | Olson et al. |
| 4,533,710 | August 6, 1985 | Olson et al. |
| 4,586,111 | April 29, 1986 | Cichanowski |
| 4,613,518 | September 23, 1986 | Ham et al. |
| 4,613,658 | September 23, 1986 | Mathias et al. |
| 4,793,949 | December 27, 1988 | Mathias et al. |
| 4,889,948 | December 26, 1989 | Mathias et al. |
| 4,906,767 | March 6, 1990 | Mathias et al. |
| 4,940,796 | July 10, 1990 | Mathias et al. |
| 4,954,371 | September 4, 1990 | Yializis |
| 4,985,522 | January 15, 1991 | Mathias et al. |
| 4,999,410 | March 12, 1991 | Mathias et al. |
| 5,026,802 | June 25, 1991 | Mathias et al. |
| 5,032,461 | July 16, 1991 | Shaw et al. |
| 5,094,759 | March 10, 1992 | Mathias et al. |
| 5,097,800 | March 24, 1992 | Shaw et al. |
| 5,134,175 | July 28, 1992 | Lucey |
| 5,137,936 | August 11, 1992 | Akiguchi et al. |
| 5,225,272 | July 6, 1993 | Poole et al. |
| 5,440,446 | August 8, 1995 | Shaw et. al. |
| 5,519,087 | May 21, 1996 | Tang |
| 5,554,120 | September 10, 1996 | Chen et al. |
| 5,565,523 | October 15, 1996 | Chen et al. |
| FR 740,410 | 1933 | France |
| DE 570,677 | 1933 | Germany |
| EP 146089 (abstract only) | 1997 | Europe |
| JP 5140234 (abstract only) | 1991 | Japan |

Antonucci et al., "Synthesis of Novel Hydrophilic and Hydrophobic Multifunctional Acrylic Monomers", Polymers of Biological and Biomedical Significance, Chapter 16, pp. 191–201 (1994).
Avci et al., "Ester Derivatives of a-Hydroxymethylacrylates: Itaconate Isomers Giving High Molecular Weight Polymers", Journal of Polymer Science, 32, pp. 2937–2945 (1994).
"Barriers to Internal Rotation about Single Bonds", Physical Organic Chemistry, 6, pp. 1–81 (1968).
Byun et al., "Improved Syntheses of Ethyl"-(Bromomethyl) Acrylate and 2-Methylene-1,3-Propanediol Via Ethyl"-(Hydroxymethyl) Acrylate", Tetrahedron Letters, 35, pp. 1371–1374 (1994).
"Dielectric Constant and Leakage Current of Spin Cast Samples", Phase I Final Report II, Appendix A. Sigma Laboratories.
Hillmyer, "The Preparation of Functionalized Polymers by Ring-Opening Metathesis Polymerization", California Institute of Technology, Pasadena, California 1995
Inamoto et al., "Revised Method for Calculation of Group Electronegativities", Chemistry Letters, pp. 1003–1006 (1982).
Jariwala et al., "Syntheses, Polymerization, and Characterization of Novel Semifluorinated Methacrylates, Including Novel Liquid Crystalline Materials", Macromolecules, 26, pp. 5129–5136 (1993).
Kiyooka et al., "Reactivity of"-Metal (group 4) Esters. Lewis Acid Mediated Reactions of "-Triphenyltin Esters with Aldehydes and Acetals", The Chemical Society of Japan, 10, pp. 721–722 (1988).
Mathias et al., "Cyclopolymerization of the Ether of Methyl"-(Hydroxymethyl)acrylate", Macromolecules, 21, pp. 545–546 (1988).
Mathias et al., "New Difunctional Methacrylate Ethers and Acetals: Readily Available Derivatives of □-Hydroxymethyl Acrylates", Macromolecules, 20, pp. 2039–2041, (1987).
Mathias et al., "Superfast Methacrylate Photomonomers: Ester Derivatives of Ethyl □-Hydroxymethacrylates", Macromolecules, 28, pp. 8872–8874 (1995).
"Organic Reactions: Volume V", John Wiley & Sons, Inc, New York, N.Y. (cover page and table of contents).

TABLE 1-continued

"Polymers of Biological and Biomedical Significance", ACS Symposium Series (Division of Polymer Chemistry, Inc. at the 204th National Meeting of the American Chemical Society); Washington, D.C. (1994).
Reed et al., "The Fundamentals of Aging in HV Polymer-film Capacitors", IEEE Transactions on Dielectrics and Electrical Insulation, 1, pp. 904–922 (1994).
Semmelhack, J. Am. Chem. Soc., 103, 2427 (1981).
Shing et al., "Practical and Rapid Vicinal Hydroxylation of Alkenes by Catalytic Ruthenium Tetraoxide", Angew. Chem., 33, pp. 2312–2313 (1994).
Stansbury, "Observations Related to the Amine-Catalyzed Coupling Reaction of Aldehydes and Acrylates", Macromolecules, 26, pp. 2981–2982 (1993).
Stansbury, "Difunctional and Multifunctional Monomers Capable of Cyclopolymerization", Macromolecules, 24, pp. 2029–2035 (1991).
"The Chemistry of Acrylonitrile" American Cyanamid Company; Petrochemicals Department. New York, N.Y. (cover page and table of contents).
Thompson et al., "Facile Synthesis and Polymerization of Ether Substituted Methacrylates", Polymer Journal, 27, pp. 325–338 (1995).
Tsuda et al., "Cyclopolymerization of ether dimers of □-(hydroxymethyl) acrylic acid and its alkyl esters: substitutent effect on cyclization efficiency and microstructures", Polymer, 35, pp. 3317–3328 (1994).
Tsuda et al., "New Dicyano-Containing Cyclopolymers Having High Stereoregularity Derived from Dimethacrylmalononitrile", Macromolecules, 26, pp. 6359–6363 (1993).
Tsuda et al., "Cyclopolymerization of Diallyl Malononitrile and the Thioether Dimer of Ethyl "-Chloromethylacrylate", Pure Appl. Chem., A31, pp. 1867–1879 (1994).
Wells, "Group Electronegativities", Prog. Phys. Org. Chem., 6, pp. 111–145 (1968).
Wideqvist, "New mononitriles of some dicarboxylic acids", Arkiv f r Kemi, 3, p. 59–67 (1951).

All documents listed in Table 1 above are hereby incorporated by reference herein in their respective entireties. As those of ordinary skill in the art will appreciate readily upon reading the Summary of the Invention, Detailed Description of Preferred Embodiments, and Claims set forth below, many of the devices and methods disclosed in these documents of Table 1 may be modified advantageously by using the teachings of the present invention.

It is a primary object of this invention to provide compounds that can be used to form polymeric dielectric materials, particularly thin dielectric films, in high energy capacitors, such as polymeric multilayer capacitors. This and other objects will be clear from the following description.

SUMMARY OF THE INVENTION

The present invention has certain objects. That is, various embodiments of the present invention provide solutions to one or more problems existing in the prior art with respect to capacitors. Specifically, the present invention addresses the need for significantly smaller capacitors having increased capacity per unit volume as a result of the development of electronic devices and circuits of reduced size. This has been accomplished by developing new organic polymeric dielectric materials for use in high energy density capacitors, i.e., capacitors that have an energy density of at least about 3 J/cm$^3$.

In comparison to known capacitors, various embodiments of the present invention may provide one or more of the following advantages: improving the ability of the capacitor to store charge as a result of increasing the dielectric constant; improving the energy loss of the capacitor as a result of decreasing the dissipation factor of the dielectric material; and improving the electrical breakdown of the capacitor as a result of increasing the dielectric strength of the dielectric material. As a result of one or more of these advantages, small, high energy density capacitors can be made.

Some embodiments of the invention include one or more of the following features: a high energy density capacitor that includes an organic polymeric dielectric material having a dielectric constant of at least about 7; a high energy density capacitor that includes an organic polymeric dielectric material having a dielectric constant of at least about 10; a high energy density capacitor that includes an organic polymeric dielectric material having a dissipation factor of no greater than about 0.10; a high energy density capacitor that includes an organic polymeric dielectric material having a dielectric strength of at least about 250 V/$\mu$m; and a high energy density capacitor that includes an organic polymeric dielectric material formed from polymerizable alkyl (alpha-substituted)acrylate monomers having at least one dipole group, wherein when the monomers are polymerized, the dipole group is attached to the main polymeric chain through a heteroatom-containing linking group.

A preferred embodiment of the present invention is a high energy density capacitor comprising an organic polymeric dielectric material having a dielectric constant of at least about 7; wherein. the organic polymeric dielectric material comprises polymerized alkyl (alpha-substituted)acrylate monomers having at least one dipole group; wherein when the monomers are polymerized, the dipole group is attached to the main polymeric chain through a heteroatom-containing linking group. Such high energy density capacitors can be included in a variety of implantable devices of a relatively small size, such as implantable defibrillator devices.

DETAILED DESCRIPTION OF PREFERRED EMBODIMENTS

Figure 1:
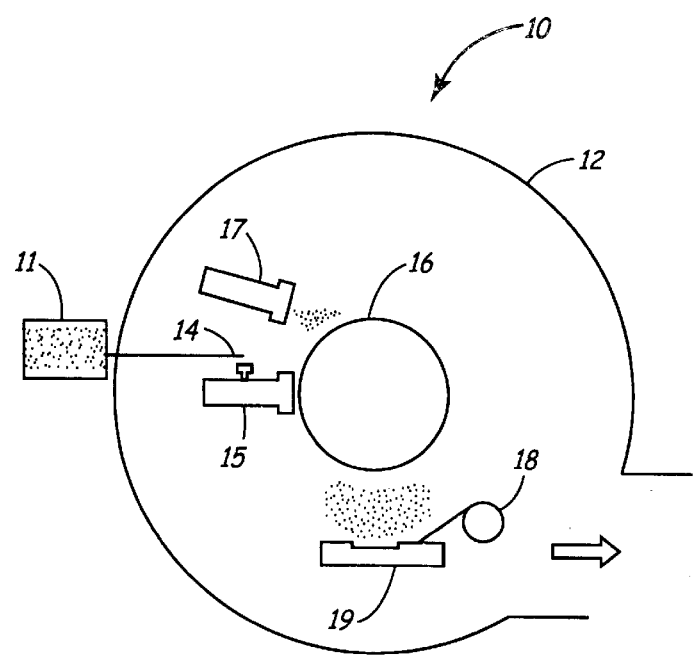
FIG. 1 is a schematic representation of a system used to form a PML capacitor using the compounds of the present invention.

The present invention is directed to organic polymeric dielectric materials for use in high energy density capacitors. Such materials are typically in the form of thin films. As used herein, a "high energy density" capacitor is one that has an energy density of at least about 3 J/cm$^3$.

Materials with a high dielectric constant (e.g., at least about 7) are insulators which, in addition to having low conductive properties, have significant capacitance (i.e., charge storage) properties. For two parallel plate electrodes separated by a dielectric material, the capacitance is measured as the charge divided by the voltage across the electrodes. The higher the capacitance, the more charge can be separated by the dielectric material (and, hence, "stored") at a given voltage. Capacitance is due to charge transfer resulting from molecular cooperativity (i.e., alignment)

among dipoles in the dielectric material. Capacitance (C) is a function of the area and separation of the parallel plate electrodes according to the following equations:

$$C_0 = \epsilon_0 (A/D)$$

and $$C = \epsilon_0 \epsilon'(A/D)$$

where $C_0$ = capacitance of free space between the electrodes
C = capacitance of the material under test
$\epsilon_0$ = permittivity of free space (a constant)
$\epsilon'$ = relative permittivity of the material under test
A = area of parallel plate electrode
D = separation of the parallel plate electrode so, $$\epsilon' = C/C_0$$

The relative permittivity ($\epsilon'$) can be measured by standard techniques, where an AC voltage of known frequency placed across the dielectric material results in a measurable current of the same frequency. This current can be separated into capacitive and conductive components because the current due to conduction is in phase with the voltage, but the current due to capacitive phenomena is 90° out of phase with the voltage. The analysis gives two quantities: 1) the relative permittivity ($\epsilon'$), a measure of the dipole (capacitive) response; and 2) the loss factor ($\epsilon''$), a measure of both ionic conductivity and dipole response.

The relative permittivity ($\epsilon'$) is a measure of the ability of the dielectric material to store charge. A high $\epsilon'$ value is desired for high energy density capacitors. The $\epsilon'$ will vary with the frequency and temperature of measurement. At high frequency the molecular structure has insufficient time to align its dipoles efficiently, and an unrelaxed relative permittivity ($\epsilon_u'$) is measured. At sufficiently low frequency, the structure has adequate time to align its dipoles, and a relaxed relative permittivity ($\epsilon_r'$) is measured. The $\epsilon_r'$ is greater than the $\epsilon_u'$ value. The $\epsilon_r'$ value is more reflective of the structure of the dielectric material than the $\epsilon_u'$ value because the dipole response requires cooperativity in molecular motion to orient the dipoles on the polymer. To best measure the relative permittivity as a property of a dielectric material's structure, the $\epsilon_r'$ value should be measured. The $\epsilon_r'$ is frequently referred to as the relaxed dielectric constant, or the low frequency dielectric constant. In this document, the term dielectric constant means the relaxed relative permittivity ($\epsilon_r'$). Preferably, suitable organic polymeric dielectric materials of the present invention have a dielectric constant of at least about 7, and more preferably, at least about 10, as cured and determined according to the procedure described in the Examples.

The loss factor ($\epsilon''$) is a frequency and temperature dependent function of both ionic conductivity and dipole response. The $\epsilon''$ can be used to measure conductivity at sufficiently low frequency, or dipole response at higher frequency. The $\epsilon''$ at sufficiently high frequency is a measure of loss in charge due to molecular rearrangements necessary to facilitate dipole alignment. A portion of the total charge is dissipated as heat to the polymer matrix during this cooperative molecular process. A commonly used term for expressing this energy loss is the dissipation factor (or, loss tangent; $\tan\delta = \epsilon''\div\epsilon'$). The higher the dissipation factor, the more energy is lost to the dielectric material, and the less charge is transferred between electrodes. the measurement is made directly from the phase angle difference ($\delta$) between the applied AC voltage and the resulting AC current. A pure conductor (i.e., resistor) will result in no phase angle shift; the frequency of the voltage in and the current out will be the same and in-phase. However, a pure capacitor will result in a 90° phase angle lag. Dielectric materials with both conductive and capacitive properties will have a phase shift between 0° and 90° (i.e., $\tan\delta > 0$). A low value of $\tan\delta$ is desired for energy transfer efficiency in high energy density capacitors. In this document, the term dissipation factor means the loss factor divided by the relaxed relative permittivity (i.e., $\tan\delta = \epsilon''\div\epsilon_r'$), taken at the same frequency and temperature. Preferably, suitable organic polymeric dielectric materials of the present invention have a dissipation factor of no greater than about 0.10, and more preferably, no greater than about 0.05, as cured and determined according to the procedure described in the Examples.

Dielectric strength is also an important characteristic of a dielectric material. In a high energy density capacitor, electrical breakdown (failure of the dielectric material in the capacitor) occurs when the applied voltage can no longer be maintained stable without excessive current flow and physical disruption. This failure of the dielectric material, due to high voltage stress, is called voltage breakdown. The dielectric strength is the measured voltage gradient at failure (usually in units of V/:m, the voltage divided by the thickness of the dielectric between the electrodes). Dielectric strength is measured by ASTM D149 using an AC voltage source increased at a constant rate across a dielectric of known thickness. Preferably, suitable organic polymeric dielectric materials of the present invention have a dielectric strength of at least about 250 V/:m, and more preferably, at least about 400 V/:m.

Such organic polymeric dielectric materials are made from one or more polymerizable compounds that include at least one polymerizable group and at least one dipole (i.e., dipole group). Preferably, the polymerizable compounds have at least two dipoles per molecule, and more preferably, at least two dipoles and at least two polymerizable groups per molecule. Such dipoles are preferably mobile, particularly once the compounds are polymerized. That is, upon polymerizing the compounds, the dipoles are capable of motion such that they can be oriented in an applied electric field. The dielectric material can also include polymerized monomers that do not have such dipole groups, as long as the dielectric material has a dielectric constant of at least about 7. Thus, mixtures of various monomers can be used to prepare the organic polymeric dielectric materials of the present invention.

To provide this mobility, the dipoles are typically pendant from the polymeric chain and attached to the remainder of the polymeric chain through a heteroatom-containing linking group. Such linking groups typically include at least one bond with a rotational energy barrier of less than about 2.8 kcal/mole, and preferably less than about 2.0 kcal/mole, when in the gas phase. As used herein, the "rotational energy barrier" or "gas phase rotational energy barrier" is the difference between the highest and lowest energy conformers for the bond under consideration in the gas phase. Rotational energy barrier values can be calculated based on information for gas phase monomers containing such bonds provided by Lowe, "Barriers to Internal Rotation and Single Bonds," *Progress in Physical Organic Chemistry*, Vol. 6, pages 1–80, Streitweiser, Jr., and Taft, ed., Interscience Publishers, 1968. For example, a C—C bond in (e.g., $CH_3$—$CH_3$) has a gas phase rotational energy barrier of about 2.8 kcal/mole to about 3.9 kcal/mole, whereas a C—Si bond (e.g., CH$_3$—SiH$_3$) has a gas phase rotational energy barrier of about 1.4 kcal/mole to about 1.8 kcal/mole, a C—N bond (e.g., CH$_3$—NH$_2$) has a gas phase rotational energy barrier of about 2.0 kcal/mole, and a C-O bond (e.g., CH$_3$—OH) has a gas phase rotational energy barrier of about 1.1 kcal/mole. The linking group includes one or more heteroatoms and one atom in the main polymeric chain, which can be the heteroatom (e.g., oxygen, silicon, sulfur, or nitrogen atom), although the heteroatom(s) of the linking group are typically not part of the main polymeric chain. The heteroatom(s), e.g., oxygen, can also be present in the linking group in the form of a functional group, e.g., carbonyl group.

The polymerizable groups are preferably (alpha-substituted)acrylate groups (e.g., acrylates, methacrylates). By placing the term "alpha-substituted" in parentheses, this means that the alpha carbon of the acrylate group may or may not be substituted. Thus, the monomers are referred to herein as alkyl (alpha-substituted)acrylates. This can include monofunctional alkyl (alpha-substituted)acrylates of the formula R'—O—C(O)—CR"=CH$_2$ substituted with one or more dipoles in R' and/or R". In this formula, R' is an organic group, preferably, a C$_1$-C$_{30}$ organic group, more preferably, a C$_1$-C$_8$ organic group, which may be aliphatic, alicyclic, aromatic, or a combination thereof, optionally containing heteroatoms or functional groups, and R" is H or an organic group, preferably C$_1$-C$_5$ organic group, which is typically an aliphatic group, optionally containing heteroatoms or functional groups. Such monomers include acrylates and alpha-substituted acrylates, such as methacrylates. The alkyl (alpha-substituted)acrylates can also include multifunctional acrylates, such as oxybismethacrylates of the type disclosed in U.S. Pat. No. 4,889,948 (Mathias et al.), substituted with one or more dipoles. Mixtures of alkyl (alpha-substituted) acrylates can be used to make the organic polymeric dielectric material of the present invention. Also, mixtures of alkyl (alpha-substituted)acrylates with other polymerizable monomers without the acrylate functionality can also be used to make the organic polymeric dielectric material of the present invention.

The dipole groups are an assemblage of one or more atoms that have partial or unitary electric charges of opposite sign separated by a finite distance. The degree of polarity is typically a function of the distance between the atoms and the electronegativity of the individual atoms. Preferably, the degree of polarity is defined by the group's electronegativity. Group electronegativities are described in Wells, *Prog. Phys. Org. Chem.*, 6, 111–145 (1968) and Inamoto et al., *Chemistry Letters*, 1003–1006 (1982). Suitable dipoles have a group electronegativity that is preferably at least about 2.5, more preferably, at least about 2.75, even more preferably, at least about 3.0, and most preferably, at least about 3.2. Examples of preferred dipole groups (including single atoms) include cyano groups, sulfone groups (including alkyl sulfones), sulfoxide groups, halogen atoms, pyrrolidonyl groups, furfuryl groups, tetrahydrofurfuryl groups, acetyl groups, acetylenyl groups, phenylacetylenyl groups, 2,2,2-trifluoroethyl groups, nitrile groups, cyanoethyl groups, methoxy groups, acetate groups, carbonate groups, diphenyl groups, dinitrile groups, difluoromethyl groups, dichloroethyl groups, trifluoromethyl groups, trichloromethyl groups, formyl groups, trifluoroacetyl groups, phenylketone groups, ester groups, cyanoester groups, acetamide groups, trifluoroacetamide groups, amines, alkylamines, dialkylamines, nitro groups, hydroxyl groups, ketones, ethers, trifluoromethyl ether groups, phenylethyl groups, salts thereof, and combinations thereof.

In order to fully exploit the potential of high energy density capacitors, particularly thin film capacitors such as PML capacitors, the alkyl (alpha-substituted)acrylate compounds (i.e., alkyl (alpha-substituted)acrylate monomers) used to produce the organic polymeric dielectric materials should preferably have a relatively high density of dipole groups per unit weight (i.e., a sufficient number of dipoles such that the polymer has a dielectric constant of at least about 7). Typically, this occurs if at least about 1 weight percent, preferably, at least about 5 weight percent, and more preferably, at least about 10 weight percent, of the monomers, or polymers produced therefrom, are dipole groups.

The alkyl (alpha-substituted)acrylate monomers used in making the organic polymeric dielectric materials also preferably have two or more polymerizable groups per molecule (hence, are multifunctional) to ensure that the product formed is a crosslinked organic polymeric dielectric material. Preferably, the crosslinks include —CH$_2$—O—CH$_2$— moieties. Crosslinking contributes to the polymer having the ability to withstand the voltages experienced by high energy density capacitors without decomposing or melting. As a result, the more highly crosslinked the polymer, the higher the dielectric strength of the material.

The alkyl (alpha-substituted)acrylate monomers used in making the organic polymeric dielectric materials preferably have a high oxygen content to permit effective clearing (e.g., substantially complete oxidation) and little, if any, carbon formation, which produces undesirable conductivity. Thus, the organic polymeric dielectric materials of the present invention have effective clearing or self-healing properties as described in Reed, *IEEE Transactions on Dielectrics and Electrical Insulation*, 1, 904–922 (1994).

The alkyl (alpha-substituted)acrylate monomers used in making the organic polymeric dielectric materials preferably have a molecular weight of less than 600 grams/mole and are liquid at or near room temperature (20–25° C.). This is particularly desirable for efficient delivery during manufacture of the capacitors.

Preferred alkyl (alpha-substituted)acrylate monomers can be represented by the following structures:

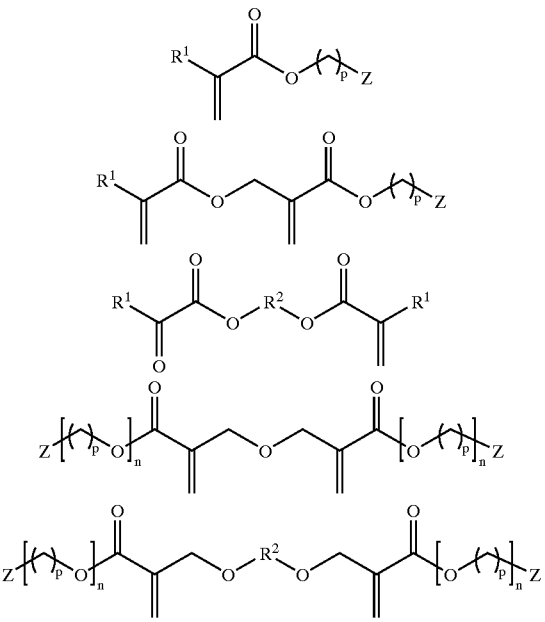

-continued

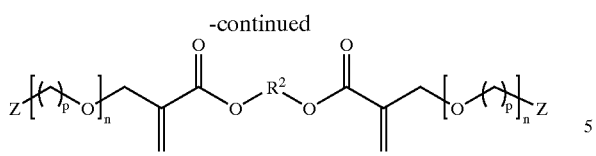

wherein:

Z is a dipole group selected from the group of cyano groups, sulfone groups (including alkyl sulfones), sulfoxide groups, halogen atoms, pyrrolidonyl groups, furfuryl groups, tetrahydrofurfuryl groups, acetyl groups, acetylenyl groups, phenylacetylenyl groups, 2,2,2-trifluoroethyl groups, nitrile groups, cyanoethyl groups, methoxy groups, acetate groups, carbonate groups, diphenyl groups, dinitrile groups, difluoromethyl groups, dichloroethyl groups, trifluoromethyl groups, trichloromethyl groups, formyl groups, trifluoroacetyl groups, phenylketone groups, ester groups, cyanoester groups, acetamide groups, trifluoroacetamide groups, amines, alkylamines, dialkylamines, nitro groups, hydroxyl groups, ketones, ethers, trifluoromethyl ether groups, phenylethyl groups, salts thereof, and combinations thereof;

n is 1–3;

p is 0–3;

$R^1$ is H or methyl; and $R^2$ is a divalent organic linking group (preferably, a linear or branched $C_1$–$C_{30}$ aliphatic group), optionally containing oxygen, nitrogen, sulfur, or silicon atoms and optionally containing pendant Z groups such that the monomers have at least one Z group.: $R^2$ can be —$CH_2$—, —$CH_2OCH_2$—, —$CH_2SCH_2$—, —$CH_2CH_2OCH_2CH_2$—, —$CH_2C(Z)_2CH_2$—, —$CH_2C(CH_2O(CH_2)_pZ)_2CH_2$—, —$CH_2C(CH_2O(CH_2)_pZ)H$—, —$(CH_2)_pOSi((CH_2)_pZ)_2O(CH_2)_p$—, —$(CH_2)_pSi((CH_2)_pZ)_2(CH_2)_p$—, —$(CH_2)_pC(CH_2O(CH_2)_pZ)_2(CH_2)_p$—, —$CH(CH_2O(CH_2)_pZ)CH(CH_2O(CH_2)_pZ)$—, —$CH_2$—{$CH(O(CH_2)_pZ)$}$_4$—$CH_2$—, —$CH${$CH(O(CH_2)_pZ)CH_2(O(CH_2)_pZ)$}$CH${$CH(O(CH_2)_pZ)CH_2(O(CH_2)_pZ)$}—.

Preferred examples of such compounds include the following:

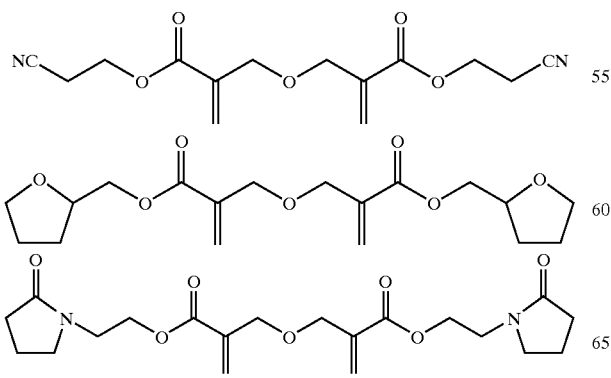

-continued

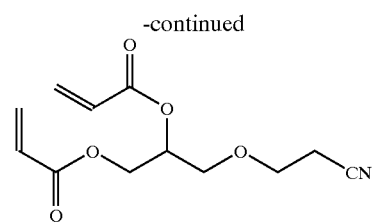

These compounds when used alone may or may not form polymeric dielectric materials having a dielectric constant of at least about 7. However, dielectric materials having a dielectric constant of at least about 7 can be formed from mixtures of these compounds with each other or with other alkyl (alpha-substituted)acrylates. These compounds are believed to be new compositions of matter, and as such, are provided by the present invention.

Such compounds can be prepared by one of skill in synthetic organic chemistry. For Example, Scheme 1 below shows a monomer that could by synthesized using the commercially available compound 1 as the starting material. Reduction using boron or aluminum hydrides would give the di(butyronitrile)silane (J. Seyden-Penne, *Reductions by the Alumino- and Borohydrides in Organic Synthesis*, VCH Publishers, New York, N.Y., 1991, p. 144). This silane can be converted to a polymerizable monomer by reacting with two equivalents of a protected allylic alcohol, such as allyl acetate (Speier, *Adv. Organomet. Chem.*, 17, 407–447, 1979). After deprotection and acrylation, compound 2 would result. Acrylation could be accomplished using acrylic acid, acryloyl chloride, transesterification, or any other synthetic equivalent.

Scheme 1
Synthesis of monomers containing silicon as the central atom.

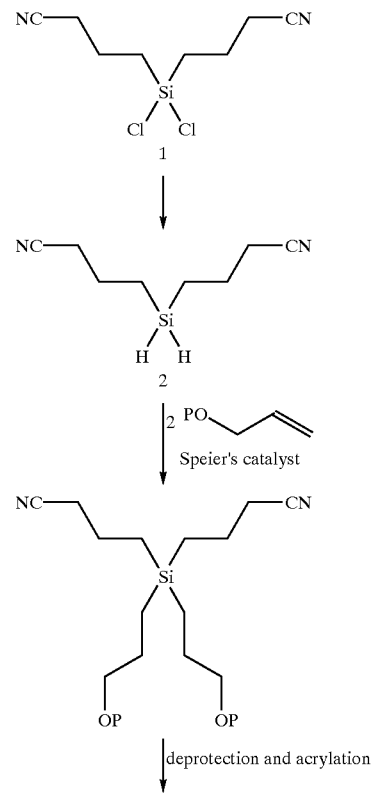

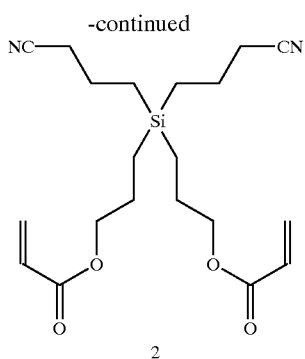

2

Alditols are also good starting materials for the synthesis of monomers that can be polymerized to materials with high dielectric constants. Alditols are molecules include a linear carbon chain with a hydroxyl group attached to each of the carbons. Since alditols are synthesized by reduction of sugars, they are commonly available with carbon chains of three to six carbons, and in a wide variety of stereochemistries. An example of how an alditol can be transformed to a monomer useful for making capacitors is shown in Scheme 2. The starting alditol 3 could represent erythritol or threitol, because the stereochemistry is not specified, and the method described could be used with higher molecular weight alditols. The first step is to protect the primary hydroxyls as the ethoxyethyl ethers (Semmelhack et al., *J. Am. Chem. Soc.,* 103, 2427 (1981)). Then the remaining hydroxyls are cyanoethylated (Bruson, "Cyanoethylation", *Organic Reactions,* Volume V, edited by R. Adams, John Wiley and Sons, Inc., New York, N.Y., 1949), using acrylonitrile in the presence of a basic catalyst, yielding compound 4. After deprotection and acrylation, the monomer 5 results. Acrylation could be accomplished by the methods described above. It is expected that monomers made from higher alditols would have higher relaxed relative permittivities, because a higher percentage of their molecular weight consists of the polar nitrile groups. The stereochemistry of the alditol used is expected to be important, because this stereochemistry can affect the mobility of the polar side chains.

Scheme 2
Synthesis of polymerizable monomers using an alditol as the starting material.

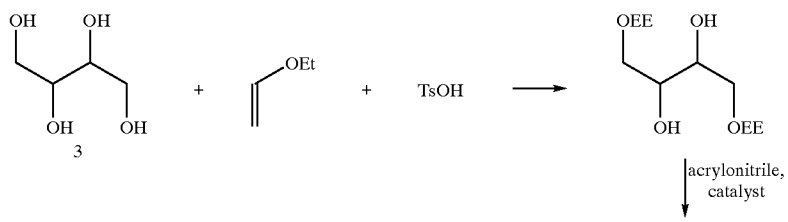

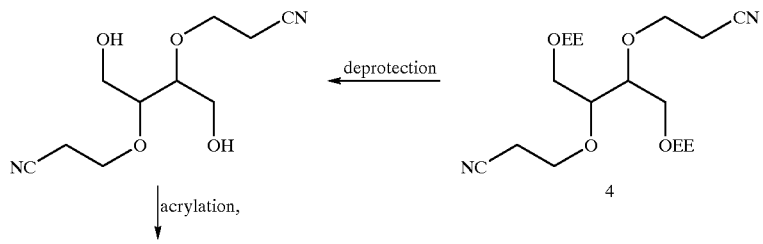

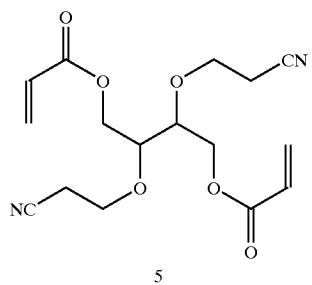

5

Synthesis of a monomer with greater side chain mobility is shown in Scheme 3. Hydroxyethyl acrylate, 6, is cyanoethylated as above, yielding 7. Compound 7 can then be converted to the corresponding oxybismethacrylate ether, 8, by heating with DABCO and formaldehyde (Tsuda et al., *Polymer*, 35(15), 3317–3328 (1994)).

or higher acrylate compounds. Reacting 9 with formaldehyde in the presence of a catalytic amount of DABCO results in formation of compound 10 (Bittman et al., *Tetrahedron Letters*, 35(9), 1371–1374 (1994)). Compound 10 can be cyanoethylated, giving the dicyanoethylated compound 11. The intermediate can also be halogenated using

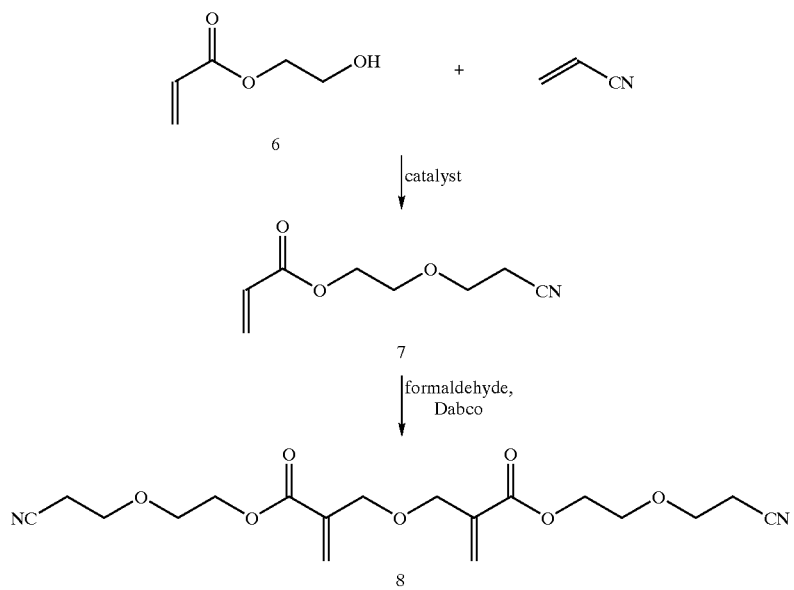

Protected pentaerythritol may be cyanoethylated with acrylonitrile as shown in Scheme 4. After deprotection, acrylation can be accomplished a discussed above.

thionyl chloride or phosphorous tribromide (Villieras et al., *Synthesis*, 924 (1982)). This halogenated compound can be converted to other derivatives of type 12 by reaction with

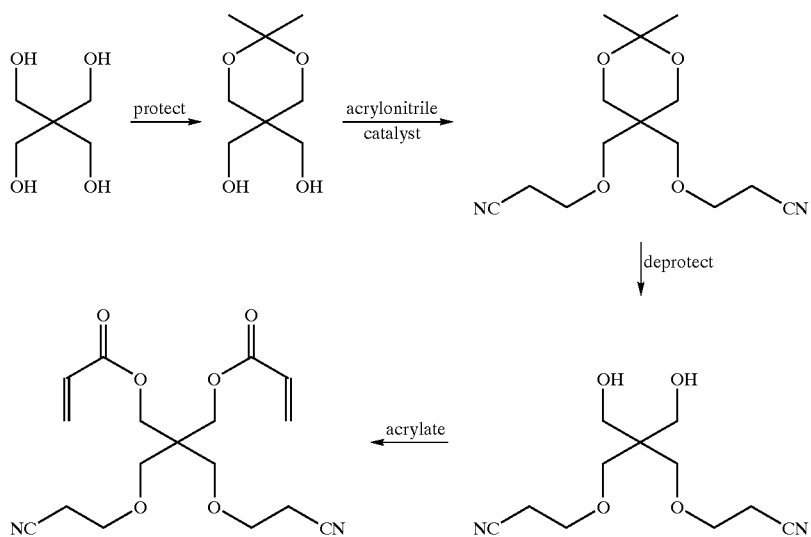

The relaxed permittivity of commercially available diacrylate monomers can be enhanced as shown in Scheme 5. Compound 9 represents any diacrylate, or for that matter, trialcohols of the the type HO—$R^1$—Z, where Z is a dipole group and $R^1$ a linking moiety.

Scheme 5
Synthesis of monomers for high relaxed permittivity polymers using diacrylates as starting materials.

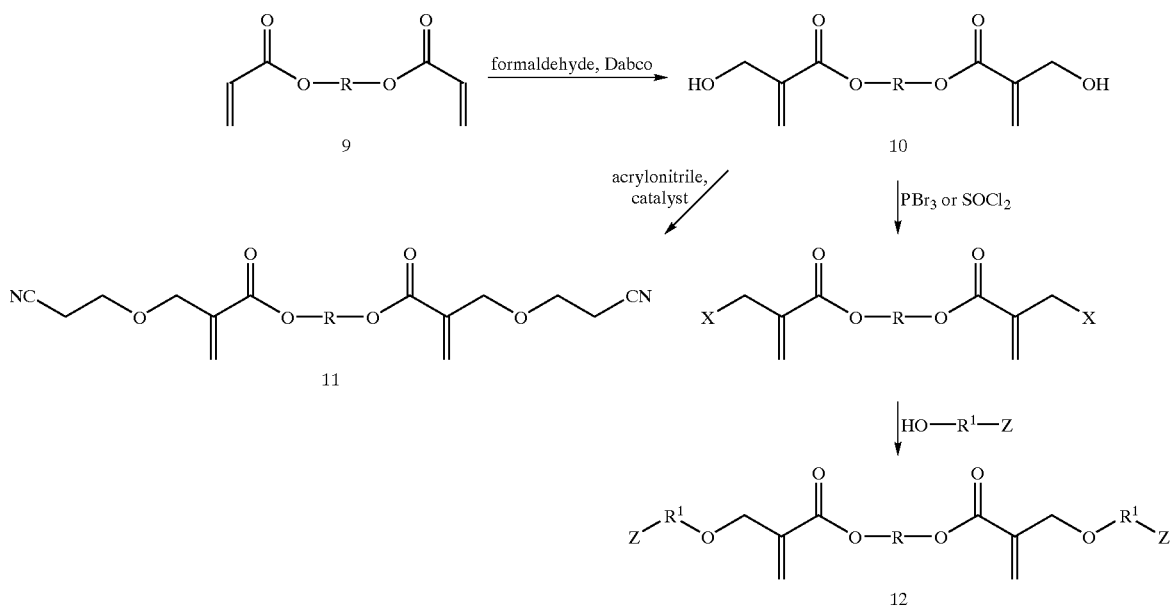

To allow synthesis of materials in which polar groups are attached to the periphery of the molecule and to the central scaffold that links the polymerizable units together, a strategy such as the one shown in Scheme 6 can be used. In this scheme, an alpha-chloromethylacryloyl chloride intermediate 13 is generated. In the first step, tert-butyl acrylate is treated with formaldehyde and DABCO. Running this reaction in the presence of water forces the equilibrium to favor the formation of tert-butyl alpha-hydroxymethylacrylate. This compound can then be treated with thionyl chloride to generate the alpha-chloromethylacryloyl chloride intermediate 13 (Jariwala et al., *Macromolecules*, 26, 5129–5136 (1993)). Reaction with 3-hydroxypropionitrile, followed by reaction with the dicyanoethylated pentaerythritol synthesized above, yields the product 14.

This product has cyanoethyl groups attached both to the polymerizable group, and to the linking group, the pentaerythritol moiety.

Scheme 6
Synthesis of a monomer using an "-chloromethylacryloyl chloride inter mediate.

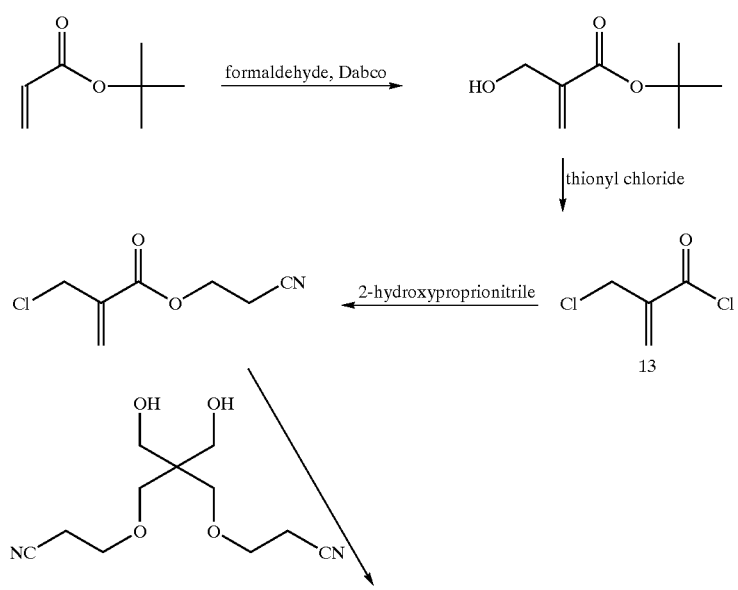

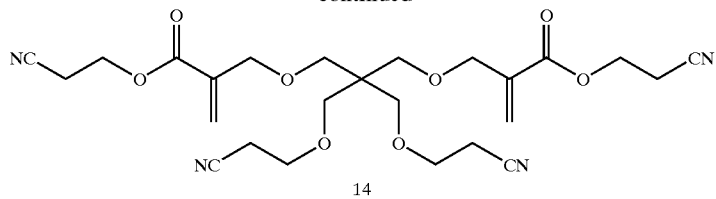

14

Finally, Scheme 7 shows an alternative route to di(2-cyanoethyl) oxybismethacrylate 15. The original synthesis is less than optimal because commercially available cyanoethylacrylate contains about fifteen percent di(ethyleneglycol) diacrylate as a side product of synthesis, which cannot be easily removed. The presence of this side product results in the formation of a mixture of isomers, instead of a single product. The route shown in Scheme 7 allows the synthesis of the desired product as a single isomer. Tert-butyl acrylate is converted to the di-tert-butyl oxybismethacrylate, which can then be converted to the diacid chloride by treatment with thionyl chloride (Tsuda, *Polymer*, 35(15), 3317–3328 (1994)). Reaction of the diacid chloride with two equivalents of 3-hydroxypropionitrile yields the desired product 15.

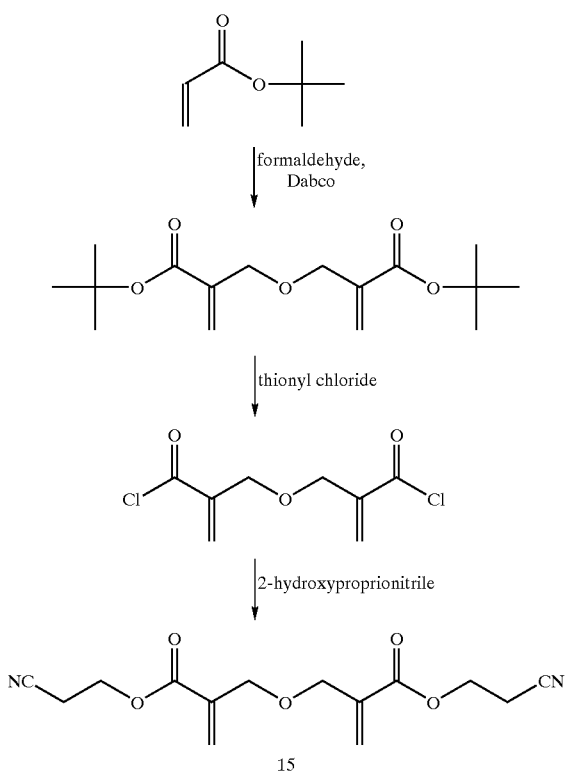

Scheme 7
Alternative synthesis of di(2-cyanoethyl) oxybismethacrylate.

Accordingly, in one embodiment, the present invention provides a high energy density capacitor comprising an organic polymeric dielectric material having a dielectric constant of at least about 7; wherein the organic polymeric dielectric material comprises polymerized alkyl (alpha-substituted)acrylate monomers having at least one dipole group; wherein when the monomers are polymerized, the dipole group is attached to the main polymeric chain through a heteroatom-containing linking group. In another embodiment, the present invention provides a high energy density capacitor comprising an organic polymeric dielectric material having a dielectric constant of at least about 10; wherein the organic polymeric dielectric material comprises polymerized alkyl (alpha-substituted)acrylate monomers having at least one dipole group; wherein when the monomers are polymerized, the dipole group is attached to the main polymeric chain through a heteroatom-containing linking group; wherein the alkyl (alpha-substituted)acrylate monomers are represented by the following structures:

wherein: Z is a dipole group (including single atoms) selected from the group of cyano, sulfone, sulfoxide, pyrrolidonyl, furfuryl, tetrahydrofurfuryl, acetyl, acetylenyl, phenylacetylenyl, 2,2,2-trifluoroethyl, nitrile, cyanoethyl, methoxy, acetate, carbonate, diphenyl, dinitrile, difluoromethyl, dichloroethyl, trifluoromethyl, trichloromethyl, formyl, trifluoroacetyl, phenylketone, ester, cyanoester, acetamide,. trifluoroacetamide, amine, alkylamine, dialkylamine, nitro, hydroxyl, ketone, ether, trifluoromethyl ether, phenylethyl group, halogen atoms, salts thereof, and combinations thereof; n is 1–3; p is 0–3; $R^1$ is H or methyl; and $R^2$ is a divalent organic linking group (preferably, a linear or branched $C_1$–$C_{30}$ aliphatic group), optionally containing oxygen, nitrogen, sulfur, or silicon atoms and optionally containing pendant Z groups such that the monomers have at least one Z group.

High energy density thin film capacitors, such as PML capacitors, can be made using the compounds of the present invention using a variety of techniques. For example, they can be made according to the method described in U.S. Pat. No. 4,954,371 (Yializis). Specifically, in one embodiment, the present invention provides a method of making a high energy density capacitor comprising an organic polymeric dielectric material having a dielectric constant of at least about 7; the method comprising: forming a film comprising polymerizable alkyl (alpha-substituted)acrylate monomers having at least one dipole group; and polymerizing the alkyl (alpha-substituted)acrylate monomers to form an organic polymeric dielectric material having a dielectric constant of at least about 7; wherein the dipole group is attached to the main polymeric chain of the organic polymeric dielectric material through a heteroatom-containing linking group.

A schematic representation of a system 10 used to form a PML capacitor sheet using the compounds of the present invention is shown in FIG. 1. In this system and method, a liquid polymerizable monomer or mixture of monomers is pumped from a monomer delivery system 11 into a vacuum chamber 12, fitted with a vacuum pump (not shown) where it is atomized using an ultrasonic atomizer 14 and evaporated using evaporator 15. It is then deposited onto a substrate, such as polyethylene terephthalate or other polymer film, on a rotating drum 16 (or directly on the drum) to form a condensed liquid film of this polymerizable monomers. This liquid film is then polymerized, and preferably crosslinked, by irradiation, such as by electron beam irradiation using an electron beam gun 17, to form a polymeric film. Other forms of irradiation can also be used, such as ultraviolet irradiation. As the drum 16 continues to turn, a layer of metal is evaporated onto the polymeric film. This metallization step can be carried out by a variety of methods, such as by sputtering or vapor depositing. For example, as shown in FIG. 1, a wire feed 18 is directed to a resistive evaporation system 19, where the metal is evaporated onto the polymer film on the rotating drum 16. The metal is typically aluminum, although it could be a wide variety of electrically conductive materials (e.g., metals), such as zinc. These processes (vapor coating, polymerizing, and metallizing) are repeated until the desired number of layers has been achieved.

Alternatively, a spin coating process can be used in which a polymerizable monomer or a mixture of polymerizable monomers is deposited onto a substrate. This film is then polymerized, and preferably crosslinked, by irradiation, such as by electron beam irradiation, to form a polymeric film. Other forms of irradiation can also be used, such as ultraviolet irradiation. Also, thermal curing can be used to convert the polymerizable monomer(s) into a polymeric film.

Figure 2:
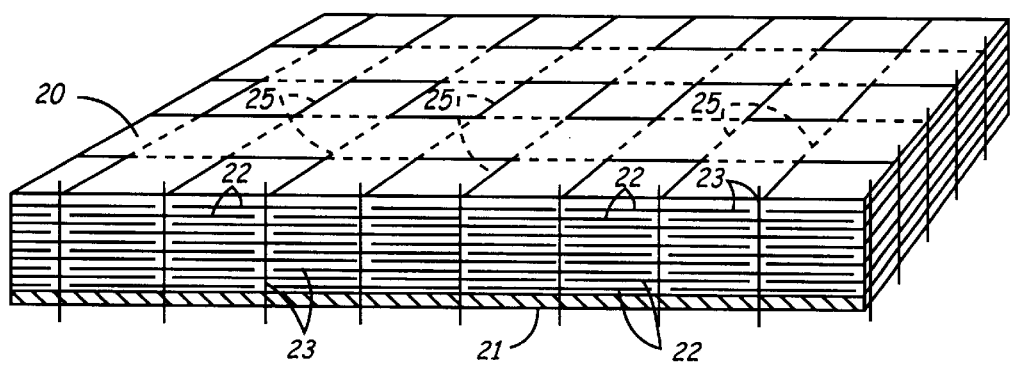
FIG. 2 is a perspective view of a capacitor sheet that includes a polymeric dielectric material made from the compounds of the present invention.

In FIG. 2, a PML sheet 20 of capacitor material is shown which includes a substrate 21 (e.g., a conductive substrate), layers of electrode material 22, and layers of organic polymeric dielectric material 23 surrounding and bonding the electrode layers together. Although only a few electrode layers are shown in FIG. 2, the capacitor sheet 20 can include up to thousands of electrode layers, as the electrode layers are typically about 50 angstroms to about 500 angstroms thick and the dielectric layers are to typically about 0.5 (m) micron to about 2.0 microns thick.

Figure 3:
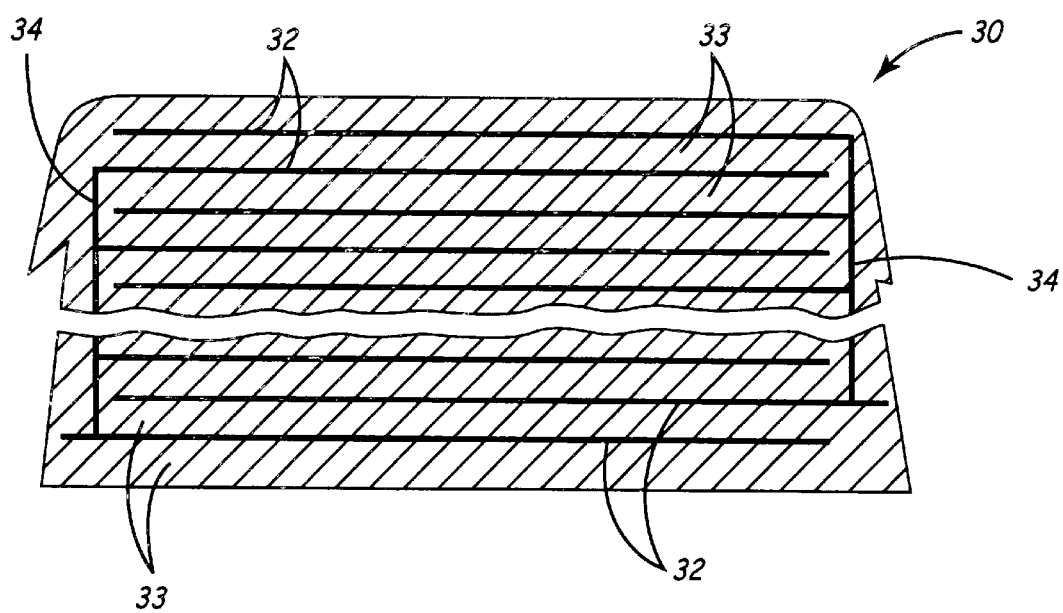
FIG. 3 is a cross-sectional view of a capacitor cut from the capacitor sheet of FIG. 2.

A schematic representation of a cross-section of a capacitor 30 is shown in FIG. 3. Capacitor 30 incorporates layers of electrode material 32 and polymeric films (i.e., layers of organic polymeric dielectric material) 33 using the compounds of the present invention. Therein, the layers of electrode material 32 are connected to a conductive material 34 to electrically connect the layers. The electrodes may be formed of materials and in configurations known in the art. Typical conductive materials useful as electrodes are aluminum, copper, zinc, tin, stainless steel, and alloys thereof.

Figure 4:
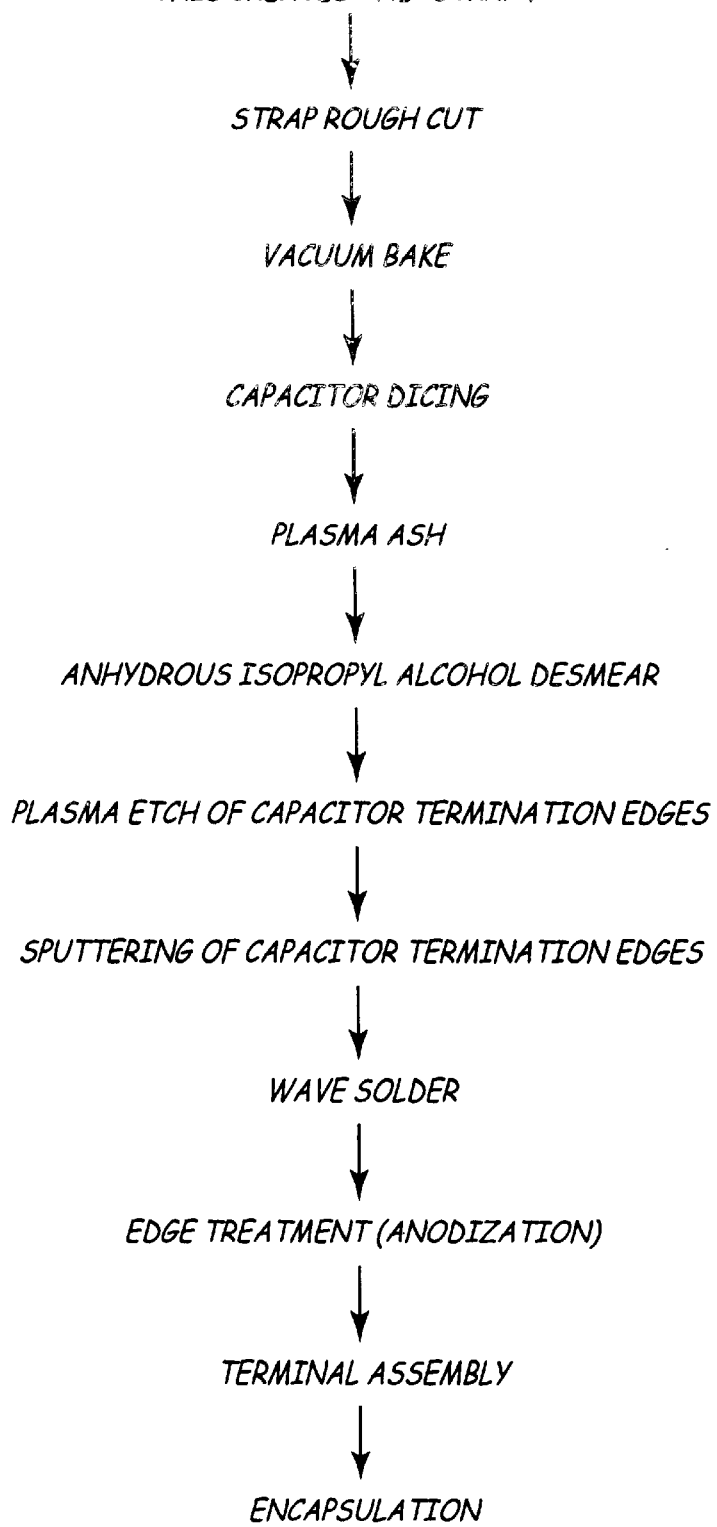
FIG. 4 is a flowchart of a preferred process for making a capacitor that includes a polymeric dielectric material made from the compounds of the present invention.

Such capacitors can be made by a variety of processes. For example, they can be made according to the method described in U.S. Pat. No. 4,613,518 (Ham et al.). A preferred process is represented by the flowchart shown in FIG. 4. To form a capacitor from the capacitor sheet (i.e., strap) 20 of FIG. 2, the capacitor sheet is rough cut, vacuum baked under mechanical pressure to finish cure and flatten the sheet, and then diced into small pieces or blocks. As shown in FIG. 2, this typically occurs along lines 25 to form a capacitor block of the desired size. Such pieces (i.e., blocks) are typically about 2–3 centimeters long, by about 2–3 centimeters wide, by about 1–3 millimeters thick. The edges of each capacitor piece are then typically smoothed by ashing them in an oxygen plasma, for example,. followed by removing the fringes of the electrode material using, for example, isopropanol in an ultrasonic bath in a desmearing step. The termination edges of the pieces of capacitor sheet are then ashed in an oxygen plasma to remove dielectric material between the electrode layers and expose the electrode layers. This removal typically occurs as the result of etching in a vacuum using, for example, a 50 Watt oxygen plasma generated at 100 kilohertz. These exposed electrode layers at the edges of the blocks of capacitor sheet are then coated with layers of nickel or copper, for example, by vapor deposition or sputtering. This establishes reliable electrical connections between the electrodes and strengthens the exposed electrode ends. This layer of metal (e.g., nickel or copper) is typically about 1000 angstroms to about 1500 angstroms thick. Solder material is applied to the outer nickel or copper layer in a wave solder step, and the edges are then optionally treated to clean them to prevent arcing. A variety of the pieces of capacitor sheet are then assembled and electrically connected to form a terminal, which is then optionally encapsulated in epoxy, for example, as a passivation layer and moisture barrier.

The capacitors according to the present invention can be used in a variety of implantable medical devices. In one specific embodiment, the present invention provides an implantable defibrillator device comprising: a device housing; a capacitor located within the device housing; and a battery located within the device housing and operatively connected to the capacitor; wherein the capacitor is a high energy density capacitor comprising an organic polymeric dielectric material having a dielectric constant at least about 7; wherein the organic polymeric dielectric material comprises polymerized alkyl (alpha-substituted)acrylate monomers having at least one dipole group; wherein when the monomers are polymerized, the dipole group is attached to the main polymeric chain through a heteroatom-containing linking group. In another embodiment, the present invention provides an implantable defibrillator device comprising: a device housing; a capacitor located within the device housing; and a battery located within the device housing and operatively connected to the capacitor; wherein the capacitor is a high energy density capacitor comprising an organic polymeric dielectric material having a dielectric constant of at least about 10; wherein the organic polymeric dielectric material comprises polymerized alkyl (alpha-substituted) acrylate monomers having at least one dipole group;

wherein when the monomers are polymerized, the dipole group is attached to the main polymeric chain through a heteroatom-containing linking group; wherein the alkyl (alpha-substituted)acrylate monomers are represented by the following structures:

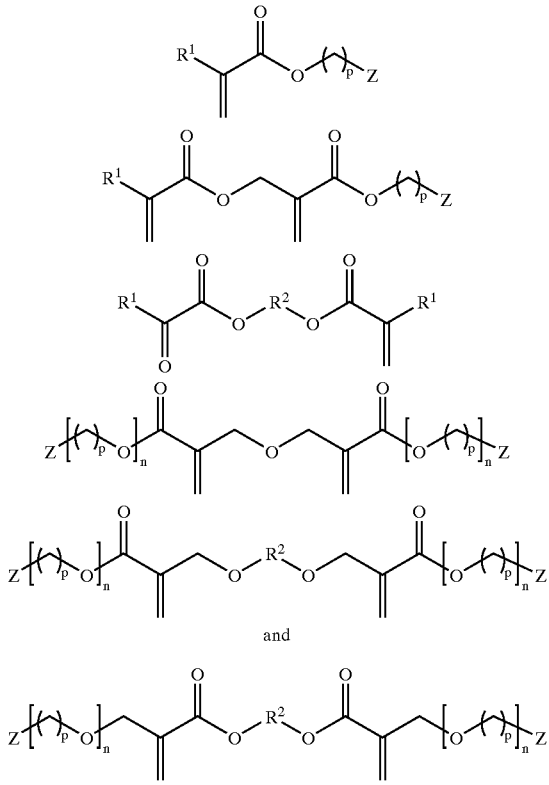

wherein: Z is a dipole group selected from the group of cyano, sulfone, sulfoxide, pyrrolidonyl, furfuryl, tetrahydrofurfuryl, acetyl, acetylenyl, phenylacetylenyl, 2,2,2-trifluoroethyl, nitrile, cyanoethyl, methoxy, acetate, carbonate, diphenyl, dinitrile, difluoromethyl, dichloroethyl, trifluoromethyl, trichloromethyl, formyl, trifluoroacetyl, phenylketone, ester, cyanoester, acetamide, trifluoroacetamide, amine, alkylamine, dialkylamine, nitro, hydroxyl, ketone, ether, trifluoromethyl ether, phenylethyl group, halogen atoms, salts thereof, and combinations thereof; n is 1–3; p is 0–3; $R^1$ is H or methyl; and $R^2$ is a divalent organic linking group (preferably, a linear or branched $C_1$–$C_{30}$ aliphatic group), optionally containing oxygen, nitrogen, sulfur, or silicon atoms and optionally containing pendant Z groups such that the monomers have at least one Z group.

Figure 5:
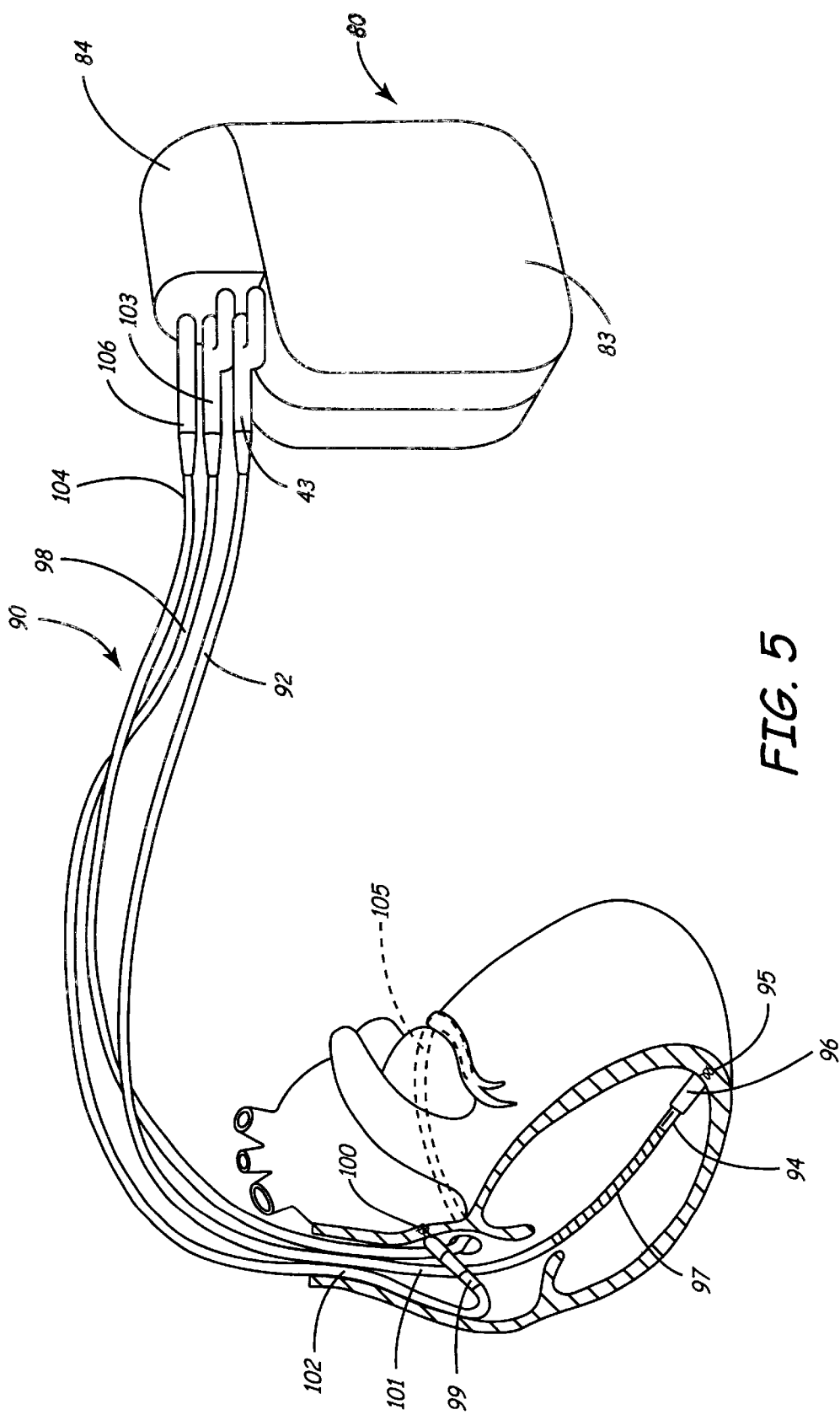
FIG. 5 is a schematic representation of an implantable medical device including a capacitor having a dielectric material according to the present invention.

FIG. 5 illustrates one defibrillator 80 and lead set 90 in which the defibrillator includes a capacitor having a dielectric material according to the present invention. The ventricular lead includes an elongated lead body 92 carrying three concentric coiled conductors separated from each other by tubular insulative sheaths. A ring electrode 94, extendible helix electrode 95 retractably mounted within an insulative electrode head 96, and an elongated defibrillation coil electrode 97 are located adjacent the distal end of the lead body 92. Each of the electrodes 94 and 95 is coupled to one of the coiled conductors within the lead body 92. Electrodes 94 and 95 can be used for cardiac pacing and for sensing ventricular dedipoleization. At the proximal end of the lead body 92 is a bifurcated connector 93 that carries three electrical connectors, each coupled to one of the coiled conductors in the lead body 92. The defibrllation coil electrode 97 may be fabricated from platinum, platinum alloy, or other materials known to be usable in implantable defibrillation electrodes and may be, e.g., about 5 centimeters in length.

The atrial/SVC lead includes an elongated insulative lead body 98 carrying three concentric coiled conductors separated from each other by tubular insulative sheaths corresponding to the structure of the ventricular lead body 92. Located adjacent the J-shaped distal end of the lead body 98 are a ring electrode 99 and an extendible helix electrode 100, mounted retractably within an insulative electrode head 101. Each of the electrodes 99 and 100 is coupled to one of the coiled conductors within the lead body 98. Electrodes 99 and 100 are used for atrial pacing and for sensing atrial dedipoleizations. An elongated coil electrode 102 is provided proximal to the ring electrode 99 and coupled to the third conductor within the lead body 98. The atrial/SVC electrode is preferably about 10 centimeters or more in length and is configured to extend from the SVC toward the tricuspid valve. In one preferred embodiment, approximately 5 centimeters of the right atrium/SVC electrode was located in the right atrium, with the remaining 5 centimeters located in the SVC. At the proximal end of the lead body 98 is a bifurcated connector 103 that carries three electrical connectors, each coupled to one of the coiled conductors in the lead body 98.

The coronary sinus lead includes an elongated insulative lead body 104 carrying one coiled conductor coupled to a defibrillation electrode 105. The defibrillation electrode 105, illustrated in broken outline in FIG. 5, is located within the coronary sinus and great vein of the heart. At the proximal end of the lead body 104 is a connector plug 106 that carries an electrical connector coupled to the coiled conductor in the lead body 104. The coronary sinus/great vein electrode 105 may be about 5 centimeters in length.

The implantable pacemaker/cardioverter/defibrillator 80 is shown with the lead connector assemblies 93, 103, and 106 inserted into the connector block 84 mounted on housing 83. Optionally, insulation of the outward facing portion of the housing 83 of the pacemaker/cardioverter/defibrillator 80 may be provided using a plastic coating, e.g., parylene or silicone rubber as is currently employed in some unidipole cardiac pacemakers. However, the outward facing portion may instead be left uninsulated, or some other division between the insulated and uninsulated portions may beemployed. The uninsulated portion of the housing 83 optionally serves as a subcutaneous defibrillation electrode, used to defibrillate either the atria or ventricles. Other lead configurations and electrode locations may of course be substituted for the lead set illustrated. For example, atrial defibrillation and sensing electrodes might be added to either the coronary sinus lead or the right ventricular lead instead of being located on a separate atrial lead, thereby allowing for a two-lead system.

The present invention is also directed to the use of a capacitor of the present invention. The method includes: providing a high energy density capacitor comprising an organic polymeric dielectric material having a dielectric constant of at least about 7; wherein the organic polymeric dielectric material comprises polymerized alkyl (alpha-substituted)acrylate monomers having at least one dipole group; wherein when the monomers are polymerized, the dipole group is attached to the main polymeric chain through a heteroatom-containing linking group; and charging the high energy density capacitor.

The following examples will further exemplify the present invention.

EXAMPLES

Materials

Technical grade (85%) 2-cyanoethyl acrylate was purchased from the Aldrich Chemical Company (Milwaukee, Wis.) and used as received. This material contained 15% di(ethylene glycol) diacrylate (Aldrich communication). Paraformaldehyde (95%), 1,4-diazabicyclo[2.2.2]octane. (98%, trade name DABCO), methyl sulfoxide (99.9%, A.C.S. spectrophotometric grade), ethyl acrylate (99%),tert-butyl acrylate (98%), tetrahydrofurfuryl acrylate, ethylene glycol methyl ether acrylate (99%), 1-(2-hydroxyethyl)-2-pyrrolidinone (98%), 2,2-dimethyl-1,3-dioxolane-4-methanol (98%, trade name SOLKETAL), sodium metal (lump, in kerosene, 99%), acrylonitrile (99+%), acetic acid (99.8%), tetrahydrofuran (99.5%), triethylamine (99%), acryloyl chloride (96%), and all other reagents were purchased from Aldrich and used as received. IRGACURE I-184 (1-hydroxycyclohexyl phenyl ketone) is a product of Ciba-Geigy Corporation.

Preparation of Di-2-cyanoethyl oxybismethacrylate

In a nitrogen-filled glove box, 93.85 grams 2-cyanoethyl acrylate, 8.4 grams DABCO, 22.5 grams paraformaldehyde, and 45 mL methyl sulfoxide were combined in a pressure tube of approximately 185 mL capacity. The tube was capped and removed to a 90° C. oven. As the tube warmed, the contents were mixed by tipping the tube back and forth until all reagents were dissolved and the reaction mixture was homogeneous. After a total of 24 hours in the oven, the tube was removed and allowed to cool to room temperature. The contents were transferred to a 500 mL single-neck round bottom flask, and the pressure tube rinsed with three 35 mL portions of toluene. The flask was outfitted with a magnetic stir bar, Dean-Stark trap, and condenser. The flask was then heated to reflux and refluxed four hours. It was then cooled to room temperature and poured into a separatory funnel containing 200 mL deionized water. The water was removed and the contents washed with 0.1 N hydrochloric solution. It was then washed with saturated aqueous sodium bicarbonate solution until neutral. The organic material was dried using anhydrous magnesium sulfate and the solvent removed under reduced pressure. IR(neat): 3112, 2970, 2936, 2882, 2253, 2230, 1726, 1640, 1456, 1412, 1332, 1306, 1273, 1182, 1153, 1109, 1030, 960, 814 cm$^{-1}$. Five grams di-2-cyanoethyl oxybismethacrylate were weighed into a small vial and 12 mg IRGACURE I-184 dissolved in 0.4 grams isopropanol were added with thorough mixing. The sample was degassed and isopropanol removed by application of vacuum.

Preparation of Ditetrahydrofurfuryl oxybismethacrylate

Tetrahydrofurfuryl acrylate (156.2 g), paraformaldehyde (30 g), and DABCO (11.2 g) were added to a pressure tube of about 185 mL capacity. Methyl sulfoxide was added to fill the tube about 90% full. The tube was capped and placed in a 95° C. oven. The tube was tipped occasionally as it warmed to dissolve and mix the components. After four days, the pressure tube was removed, cooled to room temperature, and the contents transferred to a 500 mL single-neck round bottom flask. The tube was rinsed with several portions of toluene (200 mL total) which were also added to the flask. The flask was outfitted with a Dean-Stark trap and condenser, and refluxed to to remove water by azeotropic distillation. The contents of the flask were transferred to a separatory funnel, and then washed three times with 5% aqueous hydrochloric acid and one time with saturated aqueous sodium bicarbonate solution. The organic phase was dried with anhydrous magnesium sulfate and the solvent removed under vacuum. The product was distilled under vacuum and passed through a column of neutral alumina (chloroform eluent) to remove traces of hydroxyl-containing impurities. IR(neat): 3108, 2954, 2871, 1721, 1636, 1451, 1400, 1366, 1302, 1272, 1166, 1090, 1022, 997, 952, 885, 818, 658 cm$^{-1}$.

Preparation of Di-(N-(2-pyrrolidonyl)ethyl) oxybismethacrylate

In a flask outfitted with a magnetic stir bar were combined 10 g di-tert-butyl oxybismethacrylate, 79.85 g thionyl chloride, and two drops N,N-dimethylformamide. The flask was outfitted with a nitrogen inlet and the nitrogen flow and stirring started. The reaction was heated to 40° C. for 48 hours. The excess thionyl chloride was removed by application of vacuum and nine grams N-hydroxyethyl-2-pyrrolidone were added to the crude acid chloride and the reaction again stirred under nitrogen for 48 hours. The reaction mixture was dissolved in 100 mL methylene chloride and washed with three times with 50 mL portions of 0.5 M aqueous potassium hydroxide, and then twice with deionized water. This product was purified by passage through a column containing ten inches of neutral alumina with chloroform as eluent. IR(neat): 3113, 2959, 2926, 2889, 1724, 1687, 1643, 1493, 1462, 1426, 1369, 1289, 1190, 1150, 1102, 1026, 986, 961, 815, 753, 656, 568 cm$^{-1}$.

Preparation of 2-(Methylsulfonyl)ethyl acrylate

Fifty grams 2-(methylsulfonyl)ethanol, 500 mg BHT, 25.61 g sodium carbonate, 0.5 mL pyridine, and 200 mL toluene were combined in a dry 500 mL 3-neck round bottom flask. The flask was outfitted with a mechanical stirrer, a disposable pipet to act as a sparge tube, and addition funnel. Oxygen was bubbled into the solution via the pipet for 30 minutes, and then slowed to a bubble every few seconds. The flask was cooled in an ice-water bath and the pipet pulled out to bring the tip above the solution surface. Fifty ml toluene and 40.1 g acryloyl chloride was added to the addition funnel. The acryloyl chloride solution was added dropwise over 90 minutes. The reaction was stirred at room temperature for two hours, and then heated to 50° C. for one hour. IR(neat): 3107, 3013, 2964, 2933, 1725, 1635, 1461, 1408, 1295, 1186, 1130, 1073, 984, 965, 809, 665, 482, 451 cm$^{-1}$. $^1$H NMR (300 Mhz, CDCl$_3$): δ66.40 (d), 6.10 (dd), 5.90 (d), 4.55 (t), 3.35 (t), 2.95 (s). $^{13}$C NMR (75.6 Mhz, CDCl$_3$): δ165, 132, 127, 58, 53, 43.

Preparation of 1,2-Diacryloyloxy-3-cyanoethylglycerol

This compound was synthesized in three steps as described below, starting from 2,2-dimethyl-1,3-dioxolane-4-methanol (tradename SOLKETAL):

Cyanoethylation of SOLKETAL: This reaction was performed in an inert atmosphere glovebox. Five hundred grams SOLKETAL were placed in a dry 1000 mL 3-neck round-bottom flask. This flask was then outfitted with a stir bar and stirring started. 280 mg sodium metal were added and the necks of the flask were sealed with rubber septa, one of which was pierced with a hypodermic needle to allow pressure equalization. The reaction was stirred until the sodium dissolved. 205 g acrylonitrile were then added dropwise via a pressure-equalizing addition funnel. A five degree exotherm was observed. The reaction was stirred overnight. The next day, the flask was outfitted with a condenser and thermometer. The reaction was heated to 93° C. with no visible reflux, indicating the reaction had gone to completion (the boiling point of acrylonitrile is 77° C.). The sodium was neutralized by adding one equivalent of hydrochloric acid in 10 mL water. The reaction mixture was transferred to a one liter single neck flask and vacuum distilled through a 42 inch vacuum jacketed and silvered distillation column. This column was one inch in diameter and packed with 0.16 inch PRO-PAK brand distillation packing. After the forerun, consisting primarily of unreacted SOLKETAL, 503.8 grams of product were collected (72% based on SOLKETAL).

Deprotection of cyanoethylated SOLKETAL: 250 mL deionized water and 403.7 g cyanoethylated SOLKETAL were combined in a single neck flask outfitted with a stirbar. Acetic acid was added slowly while stirring until a single phase formed (57.55 g acetic acid were used). The reaction was stirred at room temperature overnight. The acetic acid and water were removed by distillation. The remaining material was dissolved in an equal volume of tetrahydrofuran and filtered-through a chromatography column containing basic alumina. The solution was then filtered through an inch of neutral alumina in a-fritted disc filter and through paper. The THF was removed by rotary evaporation.

Acrylation of cyanoethylated SOLKETAL: A dry, 3-neck round bottom flask was outfitted with a nitrogen inlet, mechanical stirrer, and addition funnel. Dry tetrahydrofuran (500 mL), 80 g 1-cyanoethyl glycerol, 123.22 g triethylamine, 100 mg phenothiazine, and 100 mg para-methoxyphenol were placed in the flask. Nitrogen flow and stirring were started, and the flask cooled in an ice-water bath. 91.8 g acryloyl chloride were placed in the addition funnel and added dropwise to the cooled mixture over a period of about fifty minutes. After addition was complete, the cold bath was removed and the reaction mixture was stirred for three hours at room temperature. The precipitated triethylammonium hydrochloride salt was removed by filtration, and were washed with a total of 900 mL diethyl ether. The filtrate was washed three times with 250 mL portions of 10% aqueous sodium hydroxide, followed by two 500 mL portions of deionized water. The organic phase was dried with magnesium sulfate and the solvents removed under vacuum. The desired diacrylate was separated from a small amount of monoacrylated product by column chromatography on alumina using chloroform as eluent. IR(neat): 3108, 3079, 3037, 2960, 2881, 2252, 725, 1635, 1620, 1459, 1408, 1296, 1270, 1184, 1123, 1066, 983, 807, 675 cm$^{-1}$. $^1$H NMR (300 Mhz, CDCl$_3$): δ6.40 (m), 6.10 (m), 5.80 (m), 5.25 (m), 4.25 (m), 2.50 (bs), 2.05 (bs). Five grams of this material were prepared for UV curing by combining with 12.8 mg IRGACURE I-184 and mixed on a shaker tray for one hour.

Cure Procedure

A liquid diacrylate-containing monomer, such as di-2-cyanoethyl oxybismethacrylate, was mixed with 0.2% (nominal) IRGACURE I-184 photoinitiator, followed by mixing for 1 hour at room temperature. Approximately 0.5 cm$^3$ was placed over the silvered area of a Micromet System III Microdielectrometer low conductivity IC chip sensor. The coated sensor was degassed in a vacuum oven for 15 seconds. It was then passed under a UV light source at a constant rate (Fusion Systems; D bulb, speed 5, UVA dose 6.1 J/cm$^2$) to begin polymerization. The extent of polymerization was monitored by the decrease in log conductivity of the sample with the Microdielectrometer. The cure was finished when the log conductivity did not change with additional UV passes.

Test Procedure for Measurement of Dielectric Properties

Figure 6:
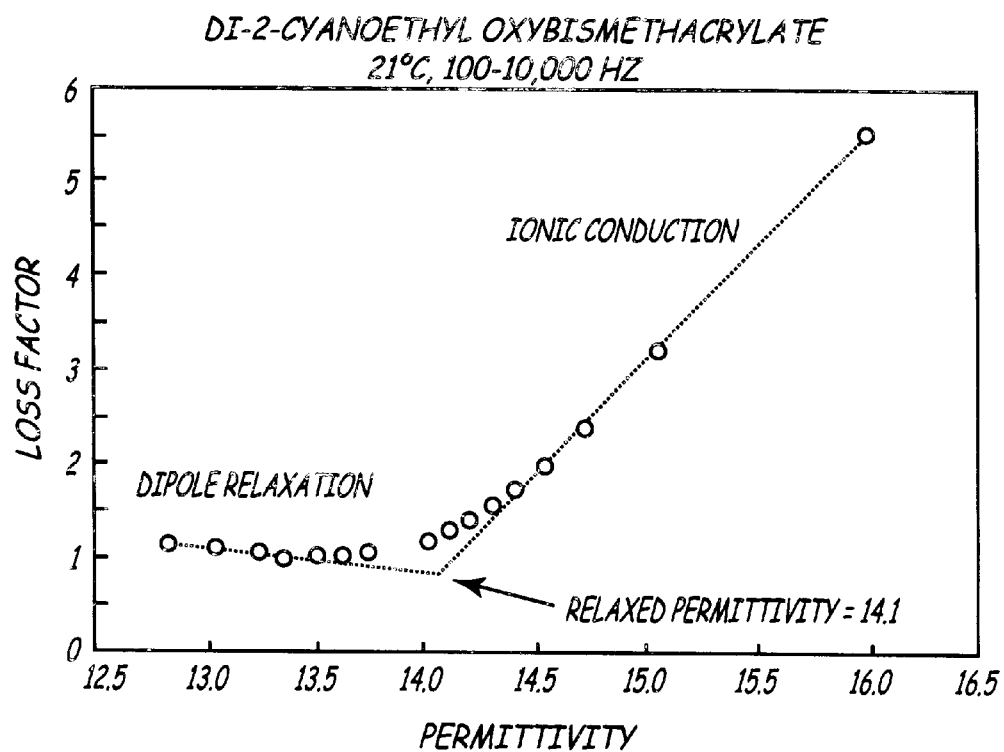
FIG. 6 is a Cole-Cole plot of polymerized di-2-cyanoethyl oxybismethacrylate.

The dielectric properties of the cured diacrylate-containing monomer, such as di-2-cyanoethyl oxybismethacrylate, were measured with a Micromet System III Microdielectrometer. The sample had already been completely cured on a calibrated Micromet low conductivity IC chip sensor as described above. The sample was subjected to a frequency scan (approximately 100,000–1 Hz) at ambient temperature, while the permittivity and loss factor were measured at each discreet frequency. A Cole-Cole plot was constructed (Loss Factor vs Permittivity), and the relaxed relative permittivity was extrapolated from the dipole response at high frequency and the ionic conduction at low frequency (FIG. 6). The relaxed relative permittivity is equivalent to the dielectric constant at the lowest frequency where a true dipole response is observed. The relaxed relative permittivity is characteristic of the dipole nature of the crosslinked polymer independent of any frequency-induced viscoelastic response. The dissipation factor is a measure of the dielectric energy loss due to viscous phenomena in the polymer. The dissipation factor is equivalent to tan δ (=Loss Factor/Relaxed Relative Permittivity).

Using these methods, the following acrylate-containing monomers were first UV cured, and then were tested for dielectric properties (dielectric constant and dissipation factor) at ambient temperature. The results are reported below in Table 1.

TABLE 1

| Monomer | Dielectric constant | Dissipation factor |
|---|---|---|
| di-2-cyanoethyl oxybismethacrylate | 15.8 | 0.06 |
| di-2-cyanoethyl oxybismethacrylate | 14.1 | 0.06 |
| di-2-cyanoethyl oxybismethacrylate | 15.6 | 0.07 |
| di-2-cyanoethyl oxybismethacrylate | 14.7 | 0.06 |
| di-tetrahydrofurfuryl oxybismethacrylate | 7.2 | 0.06 |
| di-(N-(2-pyrrolidonyl))ethyl oxybismethacrylate | 10.4 | 0.26[1] |
| 2-(methylsulfonyl) ethyl acrylate | 7.4 | 0.02 |

The preceding specific embodiments are illustrative of the practice of the invention. It is to be understood, therefore, that other expedients known to those skilled in the art or disclosed herein, may be employed without departing from the invention or the scope of the appended claims. For example, the present invention is not limited to high energy capacitors containing organic polymeric dielectric materials prepared by polymerizing the specific alkyl (alpha-substituted)acrylate monomers set forth in the examples. The present invention is also not limited to implantable defibrillator devices per se, but may find further application in other implantable medical devices. The present invention also includes within its scope methods of making and using the high energy density capacitors described herein.

What is claimed is:

1. A method of using a capacitor in a medical device application comprising:

providing a high energy density capacitor implemented in the medical device comprising an organic polymeric dielectric material having a dielectric constant of at least about 10;

wherein the organic polymeric dielectric material comprises polymerized alkyl (alpha-substituted) acrylate monomers having at least one dipole group;

wherein when the monomers are polymerized, the dipole group is attached to the main polymeric chain through a heteroatom-containing linking group; and charging the high energy density capacitor to deliver an electric charge based on requirements to deliver therapy using the medical device.

* * * * *